United States Patent [19]

Whittaker

[11] 4,007,379
[45] Feb. 8, 1977

[54] OPERATING CURCUIT FOR MACHINES
[75] Inventor: Thomas F. Whittaker, West Scarboro, Maine
[73] Assignee: Safety Engineering, Inc., Gray, Maine
[22] Filed: Nov. 6, 1975
[21] Appl. No.: 629,507
[52] U.S. Cl. .............................. 307/115; 192/131 R
[51] Int. Cl.² ...................................... H01H 47/04
[58] Field of Search .......... 307/113, 114, 115, 116; 192/131 R

[56] References Cited
UNITED STATES PATENTS

| | | | |
|---|---|---|---|
| 2,789,437 | 4/1957 | Longfield | 192/131 R |
| 3,578,123 | 5/1971 | Freeland | 192/131 R |
| 3,748,541 | 2/1972 | Ginsberg | 307/113 |

*Primary Examiner*—Herman Hohauser

[57] ABSTRACT

A circuit is provided for apparatus of the type in which a member is reciprocated through a work stroke relative to a support on which work is placed and from which it is removed by the operator. Typical operations are cutting and forming. The circuit includes two parallel leads and a pair of switches in control of both leads, one switch for each hand of the operator. The switches are normally closed with reference to the first lead. The second, normally open lead includes a device which, when energized, initiates the work stroke and the first lead includes means enabling the second lead to be closed relative to the device if the operator actuates both switches but the means of the first lead cannot again be operated unless and until both switches are in their normal position.

2 Claims, 2 Drawing Figures

OPERATING CURCUIT FOR MACHINES

RELATED APPLICATION

U.S. application Ser. No. 360,312, Filed May 14, 1973, now abandoned.

BACKGROUND REFERENCES

U.S. Pat. Nos. 2,789,437;
2,962,633;
3,019,878;
3,578,123,
3,748,541.

BACKGROUND OF THE INVENTION

That many types of power operated apparatus are dangerous to operate is, of course, well known. This has proved to be particularly true of that type of apparatus in which the operator has to place the work on a support in a position to have an operation performed thereon, cutting or forming, for example, by a member driven into and out of an operative relationship to the thus positioned work. Each such work stroke is effected by the closing of a switch. Various types of such apparatus are used in the production of many different types of products.

Insurance company records bear witness to the fact that many industrial injuries are attributed to the fact that one hand of the operator does get in the path of the reciprocating member when a work stroke is initiated by his other hand, often due to carelessness but commonly attributable to the desire of the operator to achieve a high production rate. As a consequence, proposals have been made to prevent such injuries from occurring by providing circuits in which two normally open switches were arranged in parallel with the switches positioned so that both hands of the operator had to be used in initiating a work stroke.

The difficulty with that approach to the problem is that many operators have found ways to hold one of the two switches closed in an attempt to achieve greater production by freeing one hand so that a finished piece could be more quickly removed and replaced with the result that apparatus of the type generally referred to have remained an all too frequent source of serious injuries.

THE PRESENT INVENTION

The principal objective of the present invention is to provide an operating circuit for such apparatus, the circuit employing two switches, one for each hand of the operator but including means to render it impossible to initiate a work stroke if either switch is held against returning to a normal position.

In accordance with the invention, this objective is attained by providing an operating circuit having first and second parallel leads, two switches, one for each hand of the operator, both switches in control of both leads and normally closed with respect to the first lead, and means requiring the return of both switches to their normal position before the second lead can be again closed with respect to the device by which the working stroke of the apparatus is initiated. The device is either included in the second lead by the manufacturer or the second lead attached to the device in the case of a conversion.

Another object of the invention is to provide that the means requiring the return of both switches to their normal position is attended by the opening of the first lead at the time the device is energized, an objective attained by including a relay in the second lead having a normally closed switch in the first lead.

Yet another objective of the invention is to provide that the first lead control the second lead until the device is energized, an objective attained by incorporating a relay in the first lead and providing a holding lead bypassing the two switches, said relay having two normally open switches, one in the second lead and the other in the holding lead but with the normally closed switch of the second lead relay between the holding lead switch and the first lead relay.

BRIEF DESCRIPTION OF THE DRAWINGS

The accompanying drawings illustrate a preferred embodiment of the invention

THE PREFERRED EMBODIMENT OF THE INVENTION

Figure 1:
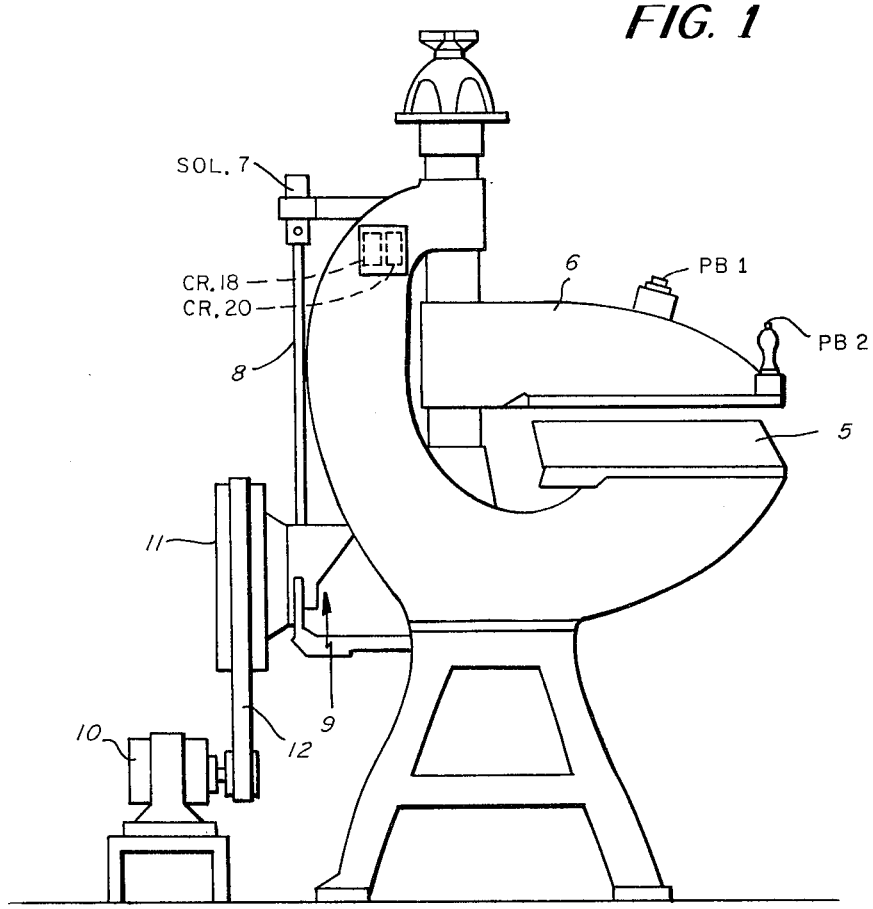
FIG. 1 is a somewhat schematic side view of typical apparatus having its operation controlled by a circuit in accordance with the invention.

The apparatus in connection with which the invention is illustrated is a machine widely used in the shoe industry, an ICM Model C manufactured by U S M Co. It is not herein detailed other than to note that it has a work support 5 and a reciprocable head 6 with a working stroke or cycle effected by energizing the solenoid 7 having a rod 8 then effecting engagement of a single revolution clutch 9 operable to connect the reciprocating means (not shown) to the drive, a motor 10 connected to a pulley 11 by means of a belt 12.

Figure 2:
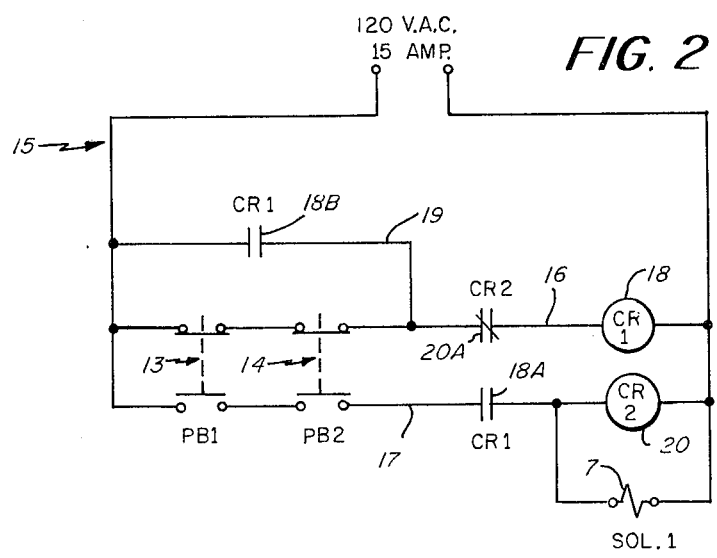
FIG. 2 is a schematic view of the circuit.

In accordance with the invention, the operating circuit includes two switches 13 and 14 so spaced and positioned that the operator must use both hands to actuate them. The circuit generally indicated at 15 in FIG. 2, has two parallel leads 16 and 17 controlled by the switches 13 and 14 which are of a type having a normal position in which they are closed with respect to the first lead 16.

The first lead 16 includes a relay 18 having a normally open switch 18A in the second lead 17 and a normally open switch 18B in a holding lead 19 bypassing the switches 13 and 14. The second lead 17 includes a relay 20 and the solenoid 7 in parallel therewith. The relay switch 20A is normally closed and is located in the lead 16 where it can de-energize the relay 18 when opened.

It will thus be seen that in operation, and with the switches 13 and 14 in their normal positions, the relay 18 is energized closing its switches 18A and 18B. To perform an operation on work placed on the support 5, the operator must depress both of the switches 13 and 14 into their second position closing the lead 17, the relay switch 18A now being closed, energizing both the solenoid 7 and the relay 20. With the relay 20 energized, the relay switch 20A opens de-energizing the relay 18 and opening the lead 17 and there is no way the relay 18 can be brought back into service without the return of the switches 13 and 14 to their normal position. Should one of the switches 13, 14 now be moved into the second position and held by some means in an attempt to defect the circuitry, one work stroke could be effected requiring the use of but one hand. In this position, however, another work stroke could not be initiated without releasing the held switch so that any such attempt would be immediately abandoned by an operator as drastically slowing his work output.

I claim:

1. A circuit for apparatus including an element having a reciprocable work stroke relative to a work support and an electrically operated device in control of the work stroke, said circuit including first and second parallel leads, two switches, one for each hand of the operator and both in control of both leads and both normally closed with respect to the first lead, and means rendering the circuit inoperative after a work stroke until both switches are again in their normally closed positions, said second lead including said device, said means including a relay in the first lead, a holding lead for said relay bypassing said first lead switches, said relay including two normally open switches, one in the holding lead and one in the second lead, and said second lead including a relay in parallel with said device and provided with a normally closed switch in said first lead between the first lead relay and the holding lead switch therefor.

2. A circuit for apparatus having an energizeable device effecting the reciprocation of a member through a work stroke, said circuit including first and second parallel leads, two switches, one for each hand of the operator and both in control of both leads and both normally closed with respect to the first lead, said circuit including means closing said second lead if both switches are closed with respect to the second lead, and means opening said first lead when said second lead is closed, said means being arranged in the circuit so that neither is again operable unless both switches are in their normally closed positions, the means opening the first lead when the second lead is closed comprising a relay in the second lead in parallel with said device and provided with a normally closed switch of the first lead, and the means closing the second lead when both switches are closed with respect thereto and including a relay in the first lead, said circuit including a holding lead bypassing said two switches, one in the second lead and one in the holding lead, and the normally closed switch of the second lead relay being between the first lead relay and the connection of the holding lead therewith.

* * * * *